Patented Dec. 25, 1928.

1,696,782

UNITED STATES PATENT OFFICE.

WALTER SCHOELLER, OF BERLIN-WESTEND, AND HANS JORDAN, OF BERLIN-STEGLITZ, GERMANY, ASSIGNORS TO THE FIRM: CHEMISCHE FABRIK AUF ACTIEN, VORM. E. SCHERING, OF BERLIN, GERMANY.

METHOD OF MAKING ALKYL ISOALKYL CYCLOHEXANOLS.

No Drawing. Application filed October 25, 1927, Serial No. 228,686, and in Germany October 26, 1926.

Our invention refers to the manufacture of alkyl isoalkyl cyclohexanols, in the first line menthol.

In a former application for patent of the United States filed by Hans Jordan on June 20, 1927, Serial No. 200,289, was described the process of producing condensation products by heating alkylated phenols (m- or p-cresol) with ketones in the presence of a condensing agent of acid character to a temperature not exceeding 100° C. According to another application filed by Hans Jordan on the same day, Serial No. 200,290, alkylisopropylene phenols could be obtained from these condensation products by heating same to 300° C., these alkyl isopropylene phenols being then isolated by fractional distillation. In our prior application filed also on June 20, 1927, Serial No. 200,298, we have further described the way in which from these alkyl isoproplene phenols menthol and its isomers, as well as the corresponding homologues can be produced by hydrogenating the alkyl phenols hydrogenated in the nucleus and saturated.

We have now found that the production of phenols etc. can be rendered more economical and advantageous, if the mixture of the products of decomposition is first hydrogenated and the products of hydrogenation are then separated by fractional distillation.

This new method involves the advantage that the tendency of polymerizing shown by the unsaturated phenols, which is the cause of a drop of yield when fractionating in accordance with the method claimed in the aforesaid application for patent Ser. No. 200,290. is obviated by the hydrogenation. The distillation of the hydrogenation mixture occurs in a quantitative manner without leaving any residue, in contradistinction to the distillation of the mixture obtained in accordance with the process aforesaid described in patent application Serial No. 200,290, which, according to the time consumed in the distillation and according to the temperature, leaves a residue consisting of varying quantities of polymer phenols.

In the hydrogenation of the mixture we prefer using a nickel catalyst. When eight atoms hydrogen have entered into combination, the hydrogenation mixture is subjected to fractional distillation, preferably in vacuo.

The term "alkylated phenols" used in the claims is intended to mean m- or p-cresol.

Various changes may be made in the details disclosed in the foregoing specification without departing from the invention or sacrificing the advantages thereof.

We claim:—

1. The method of producing alkyl isoalkyl cyclohexanols, comprising first decomposing by heating the condensation products obtainable from alkylated phenols and ketones, thereafter hydrogenating the mixture of the products of decomposition until eight hydrogen atoms have entered into combination, and finally separating from the mixture the hydrogenated alkyl isoalkyl phenols.

2. The method of producing alkyl isoalkyl cyclohexanols, comprising first decomposing by heating the condensation products obtainable from alkylated phenols and acetone, thereafter hydrogenating the mixture of the products of decomposition until eight hydrogen atoms have entered into combination, and finally separating from the mixture the hydrogenated alkyl isoalkyl phenols.

3. The method of producing alkyl isoalkyl cyclohexanols. comprising first decomposing by heating the condensation products obtainable from m-cresol and acetone, thereafter hydrogenating the mixture of the products of decomposition until eight hydrogen atoms have entered into combination, and finally separating from the mixture the hydrogenated alykl isoalkyl phenols.

4. The method of producing alkyl isoalkyl cyclohexanols, comprising first decomposing by heating the condensation products obtainable from p-cresol and acetone, thereafter hydrogenating the mixture of the products of decomposition until eight hydrogen atoms have entered into combination, and finally separating from the mixture p-hexahydro menthol.

In testimony whereof we affix our signatures.

WALTER SCHOELLER.
HANS JORDAN.